United States Patent
Wang et al.

(10) Patent No.: US 12,485,911 B2
(45) Date of Patent: Dec. 2, 2025

(54) METHOD AND SYSTEM FOR MODELING PERSONALIZED CAR-FOLLOWING DRIVING STYLES WITH MODEL-FREE INVERSE REINFORCEMENT LEARNING

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Rohit Gupta, Santa Clara, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 363 days.

(21) Appl. No.: 17/936,459

(22) Filed: Sep. 29, 2022

(65) Prior Publication Data
US 2024/0124003 A1    Apr. 18, 2024

(51) Int. Cl.
*B60W 50/00*     (2006.01)
*B60W 50/06*     (2006.01)
*B60W 60/00*     (2020.01)

(52) U.S. Cl.
CPC .......... *B60W 50/06* (2013.01); *B60W 60/001* (2020.02); *B60W 2520/00* (2013.01); *B60W 2554/80* (2020.02)

(58) Field of Classification Search
CPC ............... B60W 50/06; B60W 60/001; B60W 2520/00; B60W 2554/80;
(Continued)

(56) References Cited

U.S. PATENT DOCUMENTS

2020/0142420 A1*  5/2020  Kusari ............ B60W 30/18163
2020/0334577 A1*  10/2020 Anderson ............ G06Q 10/063
(Continued)

FOREIGN PATENT DOCUMENTS

CN     107016193 A  *  8/2017  ............. G06F 30/20
CN     109733415 A  *  5/2019
(Continued)

OTHER PUBLICATIONS

Gao, H et al. Car-following method based on inverse reinforcement learning for autonomous vehicle decision-making. International Journal of Advanced Robotic Systems. 2018; 15(6) [online], [retrieved on Sep. 5, 2024]. Retrieved from URL:https://journals.sagepub.com/doi/full/10.1177/1729881418817162> (Year: 2018).*
(Continued)

*Primary Examiner* — Peter D Nolan
*Assistant Examiner* — Peter Y Ning
(74) *Attorney, Agent, or Firm* — DINSMORE & SHOHL LLP (57) ABSTRACT

A method may include learning reward functions for a plurality of first vehicles based on first vehicle data associated with the plurality of first vehicles using inverse reinforcement learning, associating each vehicle of the plurality of first vehicles with one cluster among a plurality of clusters based on the reward functions, determining a centroid reward function for each of the clusters based on the reward functions associated with each cluster, performing a comparison between second vehicle data associated with a second vehicle and the first vehicle data, determining a vehicle among the plurality of first vehicles having associated first vehicle data that is most similar to the second vehicle data based on the comparison, associating the second vehicle with the cluster associated with the determined vehicle, and controlling operation of the second vehicle
(Continued)

based on the centroid reward function of the cluster associated with the second vehicle.

20 Claims, 9 Drawing Sheets

(58) Field of Classification Search
CPC ........ B60W 2050/0082; B60W 30/165; G06N 3/006; G06N 3/088; G06N 7/01; G06N 20/00; G08G 1/22
See application file for complete search history.

(56) References Cited

U.S. PATENT DOCUMENTS

| | | | |
|---|---|---|---|
| 2021/0179118 A1* | 6/2021 | Alt | G06N 3/006 |
| 2022/0219695 A1* | 7/2022 | Satti | B60W 40/09 |

FOREIGN PATENT DOCUMENTS

| | | | | |
|---|---|---|---|---|
| CN | 109733415 B | | 8/2020 | |
| CN | 112172813 A | * | 1/2021 | ......... B60W 40/105 |
| CN | 112498354 A | * | 3/2021 | ...... B60W 30/18163 |
| CN | 112560354 A | * | 3/2021 | ............. G06F 18/214 |
| CN | 112201069 B | * | 10/2021 | ............. G06N 3/048 |
| CN | 113741384 A | * | 12/2021 | ......... G05B 23/0213 |
| CN | 114037015 A | * | 2/2022 | ........... G06F 18/2411 |
| CN | 112172813 B | | 3/2022 | |
| EP | 3751465 A1 | * | 12/2020 | ............. G08G 1/165 |
| WO | WO-2018220418 A1 | * | 12/2018 | ........ B60W 30/0956 |

OTHER PUBLICATIONS

Lee, J et al. Monte-Carlo Tree Search for Constrained POMDPs. Neural Information Processing Systems (2018) [olnine], [retrieved on Sep. 19, 2024]. Retrieved from the Internet <URL: https://dl.acm.org/doi/pdf/10.5555/3327757.3327889> (Year: 2018).*

Zhou, Y et al. Modeling Car-Following Behaviors and Driving Styles with Generative Adversarial Imitation Learning. Sensors (Basel). Sep. 4, 2020;20(18):5034 [online], [retrieved on Sep. 6, 2024]. Retrieved from the Internet <URL: https://pubmed.ncbi.nlm.nih.gov/32899773/> (Year: 2020).*

Adams, S et al. A survey of inverse reinforcement learning. Artifical Intelligence Review 55, 4307-4346 (2022) [online], [retrieved on Sep. 16, 2024]. Retrieved from the Internet <URL:https://doi.org/10.1007/s10462-021-10108-x/> (Year: 2022).*

Car-following method based on inverse reinforcement learning for autonomous vehicle decision-making (https://www.researchgate.net/publication/329480375_Car-following_method_based_on_inverse_reinforcement_learning_for_autonomous_vehicle_decision-making) Nov. 2018.

Modeling car-following behaviors and driving styles with generative adversarial imitation learning (https://www.ncbi.nlm.nih.gov/pmc/articles/PMC7571238/) Sep. 4, 2020.

* cited by examiner

| INTENTION | ACCELERATION | | |
|---|---|---|---|
| | BREAK | MAINTAIN | ACCELERATION |
| HESITATING | 0.3 | 0.4 | 0.3 |
| NORMAL | 0.1 | 0.8 | 0.1 |
| AGRESSIVE | 0.4 | 0.2 | 0.4 |

$$\begin{bmatrix} v'_{ego} \\ y'_{ego} \\ v'_{lead} \\ y'_{lead} \end{bmatrix} = \begin{bmatrix} v_{ego} \\ y_{ego} \\ v_{lead} \\ y_{lead} \end{bmatrix} + \begin{bmatrix} at \\ v_{ego}t + 0.5at^2 \\ a_{lead}t \\ v_{lead}t + + 0.5a_{lead}t^2 \end{bmatrix}$$

METHOD AND SYSTEM FOR MODELING PERSONALIZED CAR-FOLLOWING DRIVING STYLES WITH MODEL-FREE INVERSE REINFORCEMENT LEARNING

TECHNICAL FIELD

The present specification relates to autonomous driving and more particularly to a method and system for modeling personalized car-following driving styles with model-free inverse reinforcement learning.

BACKGROUND

Autonomous or semi-autonomous vehicles may perform certain driving functions without any input by the driver. In particular, cruise control functionality may allow a driver to set a desired speed for a vehicle and cause the vehicle to maintain the desired speed without the driver utilizing the accelerator or brake pedals. Adaptive cruise control (ACC) functionality may similarly cause a vehicle to maintain a desired speed while also maintaining a certain following distance from other vehicles. That is, an ACC system may cause a vehicle to slow down from the desired speed if another vehicle is detected within a threshold distance in front of the vehicle.

Thus, ACC may allow a driver to maintain a constant speed while driving a vehicle, while also keeping the vehicle a certain distance behind other vehicles to prevent collisions. However, different drivers may have different naturalistic driving behaviors when following other vehicles while driving manually. For example, different drivers may have different desired following distances, and different desired rates of acceleration or deceleration when a change of speed is needed. Furthermore, drivers may have different driving behaviors at different times of day and in different driving conditions. As such, a typical ACC system may exhibit driving behavior that is different than the naturalistic driving behavior of a driver, which may be uncomfortable for the driver. Therefore, personalized adaptive cruise control (P-ACC) may be desired, which mimics the naturalistic driving behavior of a driver.

SUMMARY

In an embodiment, a method may include learning reward functions for a plurality of first vehicles based on first vehicle data associated with the plurality of first vehicles using inverse reinforcement learning, associating each vehicle of the plurality of first vehicles with one cluster among a plurality of clusters based on the reward functions, determining a centroid reward function for each of the clusters based on the reward functions associated with each cluster, performing a comparison between second vehicle data associated with a second vehicle and the first vehicle data, determining a vehicle among the plurality of first vehicles having associated first vehicle data that is most similar to the second vehicle data based on the comparison, associating the second vehicle with the cluster associated with the determined vehicle, and controlling operation of the second vehicle based on the centroid reward function of the cluster associated with the second vehicle In another embodiment, a computing device may include a controller programmed to learn reward functions for a plurality of first vehicles based on first vehicle data associated with the plurality of first vehicles using inverse reinforcement learning, associate each vehicle of the plurality of first vehicles with one cluster among a plurality of clusters based on the reward functions, determine a centroid reward function for each of the clusters based on the reward functions associated with each cluster, perform a comparison between second vehicle data associated with a second vehicle and the first vehicle data, determine a vehicle among the plurality of first vehicles having associated first vehicle data that is most similar to the second vehicle data based on the comparison, associate the second vehicle with the cluster associated with the determined vehicle; and control operation of the second vehicle based on the centroid reward function of the cluster associated with the second vehicle

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for personalized car-following driving styles with mode-free inverse reinforcement learning. Different drivers may have different preferences for how they like to follow other vehicles. For example, certain drivers may prefer to follow vehicles more closely than other drivers. Other drivers may prefer to maintain a certain speed when following other drivers. As such, when a vehicle is performing autonomous driving, it may be desirable for the autonomous driving vehicle to mimic the driver's preferred driving behavior when following other vehicles. This may make the driver feel more comfortable when utilizing autonomous driving. As such, it may be desirable for an autonomous driving system to learn a driver's preferences for vehicle following and utilize those preferences when performing autonomous driving in order to perform P-ACC.

Learning a driver's preferences when following other vehicles can be achieved by observing a driver's behavior when following other vehicles while manually driving a vehicle. In particular, inverse reinforcement learning (IRL) may be used to learn a reward function that a driver attempts to maximize when performing manual driving. The reward function may then be used in autonomous driving to mimic the driver's naturalistic driving tendencies.

Many IRL methods rely on prior knowledge of a transition model, which is often difficult to satisfy in real life situations. Accordingly, model-free IRL methods relax this requirement and may achieve better performance than traditional model-based IRL methods. Furthermore, IRL methods of learning a reward function of a driver may be computationally expensive and difficult to achieve in real-time situations. As such, in embodiments disclosed herein, driving data from a plurality of drivers is collected and analyzed in an off-line situation. In particular, model-free IRL is used to learn a reward function associated with each driver. The resulting reward functions are then analyzed using cluster analysis to determine a plurality of clusters associated with a plurality of driving styles. An aggregate or centroid reward function may then be determined for each cluster of reward functions.

In addition, in embodiments disclosed herein, Gaussian Mixture Models (GMM) are developed for the plurality of drivers in the driving data. Then, when P-ACC is to be performed for a new driver who is not included in the driving data, driving data associated with the new driver may be input to the GMM and the output of the GMM may be compared to the GMM output associated with the plurality of drivers from the driving data using Kullback-Leibler (KL)-divergence. The new driver may then be classified into the cluster associated with the driver whose GMM output is most similar to the GMM output for the new driver. As such, the aggregate reward function of that cluster may be used to perform P-ACC for the new driver. In particular, the reward function may be utilized as part of a partially observable Markov decision process (POMDP) to mimic the driver's driving preferences. Because calculating a GMM output is less computationally intensive then performing IRL, the disclosed embodiments may be more easily performed in an on-line driving scenario.

Figure 1:
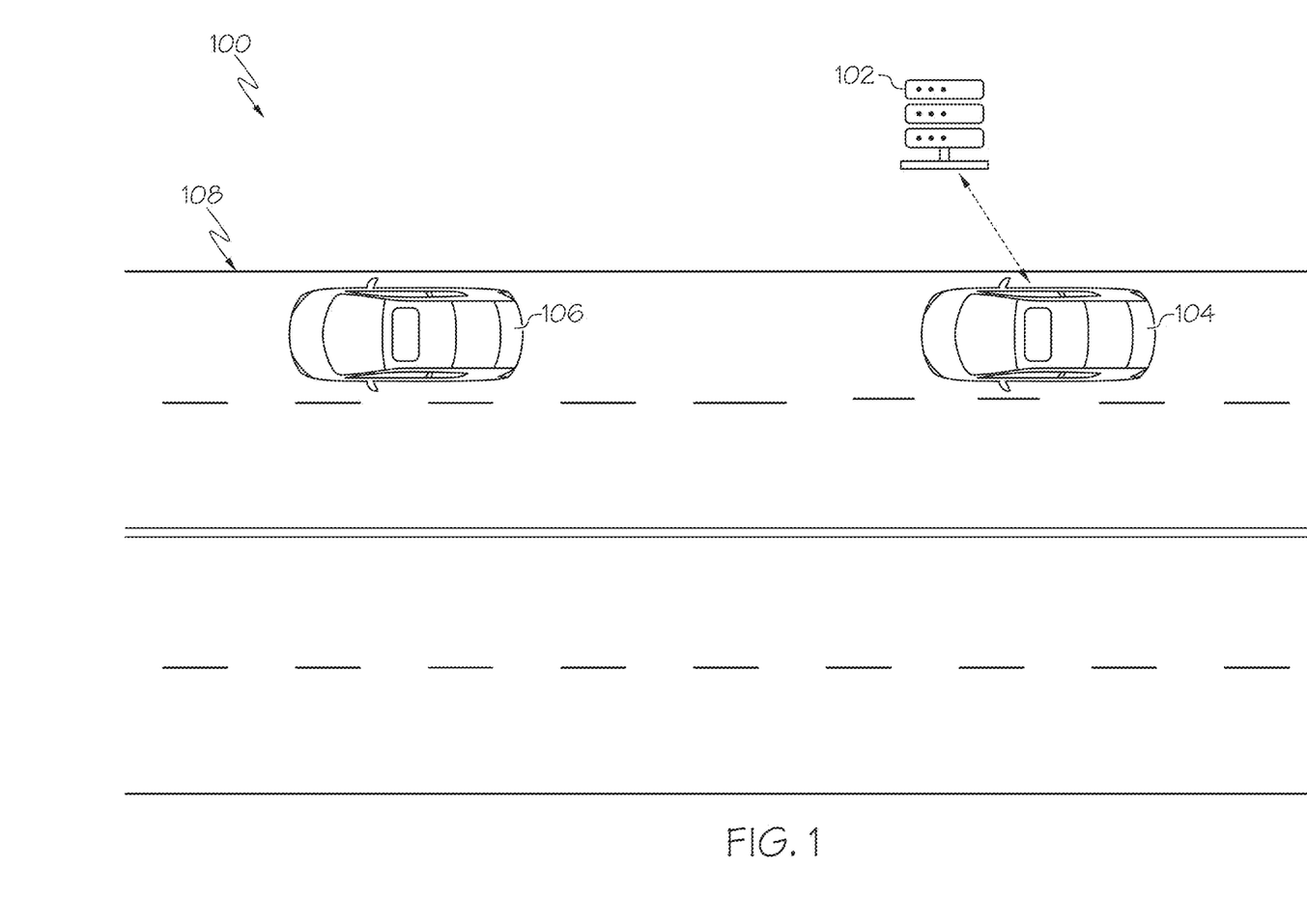
FIG. 1 schematically depicts a system comprising a P-ACC server, according to one or more embodiments shown and described herein.

Turning now to the figures, FIG. 1 schematically depicts a system for modeling personalized car-following driving styles with model-free inverse reinforcement learning. A system 100 includes a P-ACC server 102. The P-ACC server 102 may receive data from connected vehicles and may implement P-ACC, as disclosed herein. In the example of FIG. 1, an ego vehicle 104 drives behind a vehicle 106 along a road 108.

In the example of FIG. 1, the ego vehicle 104 may be manually driven by a driver and may have a P-ACC system, as disclosed herein. In the example of FIG. 1, the ego vehicle 104 is a connected vehicle. A connected vehicle is able to communicate remotely with systems outside of the vehicle (e.g., with the P-ACC server 102).

The P-ACC server 102 may be communicatively coupled to the ego vehicle 104. While the example of FIG. 1 illustrates a single ego vehicle 104 being communicatively coupled to the P-ACC server 102, in other examples, any number of connected vehicles may be communicatively coupled to the P-ACC server 102.

In the illustrated example, the P-ACC server 102 comprises a cloud computing device. In some examples, the P-ACC server 102 may comprise a road-side unit (RSU) positioned near the road 108. In these examples, the system 100 may include any number of RSUs spaced along the road 108 such that each RSU covers a different service area. That is, as the ego vehicle 104 or other vehicles drive along the road 108, the vehicles may be in range of different RSUs at different times such that different RSUs provide coverage at different locations. Thus, as the ego vehicle 104 drives along the road 108, the ego vehicle 104 may move between coverage areas of different RSUs.

In other examples, the P-ACC server 102 may be another type of server or remote computing device and may be positioned remotely from the road 108. In some examples, the P-ACC server 102 may be an edge server. In some examples, the P-ACC server 102 may be a moving edge server, such as another vehicle.

Figure 2:
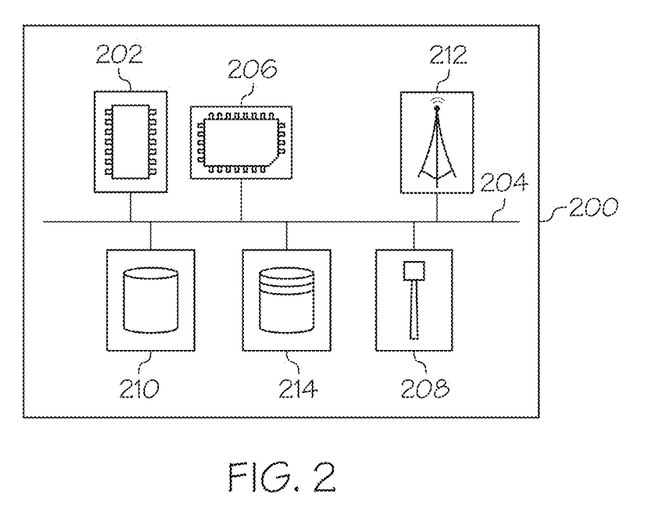
FIG. 2 depicts a schematic diagram of a vehicle system, according to one or more embodiments shown and described herein.

FIG. 2 depicts a vehicle system 200 that may be included in the ego vehicle 104 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect positions, trajectories, velocities, and accelerations of other vehicles. The data captured by the vehicle sensors 210 may be stored in the data storage component 214.

Still referring to FIG. 2, the vehicle system 200 comprises network interface hardware 212 for communicatively coupling the vehicle system 200 to the P-ACC server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit data about objects detected by the vehicle system 200, as disclosed in further detail below.

Still referring to FIG. 2, the vehicle system 200 comprises a data storage component 214. The data storage component 214 may store data used by various components of the vehicle system 200. In addition, the data storage component 214 may store data collected by the vehicle sensors 210.

In some embodiments, the vehicle system 200 may be communicatively coupled to the P-ACC server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
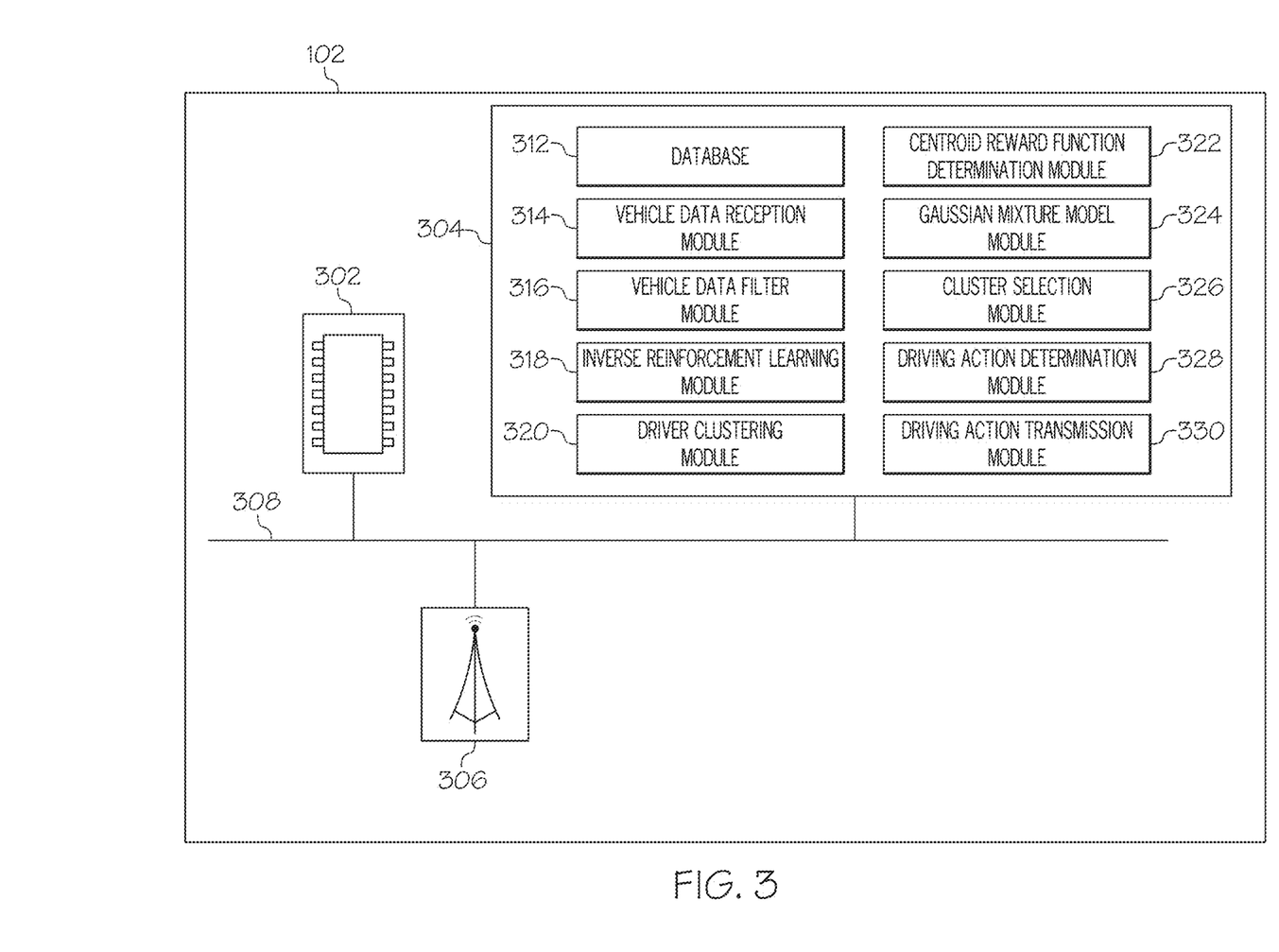
FIG. 3 depicts a schematic diagram of the P-ACC server of FIG. 1, according to one or more embodiments shown and described herein.

Now referring to FIG. 3, the P-ACC server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the P-ACC server 102 may transmit and receive data to and from vehicles (e.g., the ego vehicle 104 of FIG. 1).

The one or more memory modules 304 include a database 312, a vehicle data reception module 314, a vehicle data filter module 316, an inverse reinforcement learning (IRL) module 318, a driver clustering module 320, a centroid reward function determination module 322, a Gaussian Mixture Model (GMM) module 324, a cluster selection module 326, a driving action determination module 328, and a driving action transmission module 330. Each of the database 312, the vehicle data reception module 314, the vehicle data filter module 316, the IRL module 318, the driver clustering module 320, the centroid reward function determination module 322, the GMM module 324, the cluster selection module 326, the driving action determination module 328, and the driving action transmission module 330 may be a program module in the form of operating systems, application program modules, and other program modules stored in the one or more memory modules 304. In some embodiments, the program module may be stored in a remote storage device that may communicate with the P-ACC server 102. In some embodiments, one or more of the database 312, the vehicle data reception module 314, the vehicle data filter module 316, the IRL module 318, the driver clustering module 320, the centroid reward function determination module 322, the GMM module 324, the cluster selection module 326, the driving action determination module 328, and the driving action transmission module 330 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store data received from vehicles, as disclosed herein. As discussed above, in embodiments disclosed herein, driving data from a plurality of drivers is analyzed in order to determine reward functions for each of the plurality of drivers. As such, the database 312 may store vehicle data received by the vehicle data reception module 314, as discussed in further detail below. The database 312 may also store other data used by the memory modules 304.

The vehicle data reception module 314 may receive vehicle data from one or more vehicles or from other sources. As discussed above, the P-ACC server 102 may receive vehicle data associated with a plurality of vehicles and may analyze the data to determine reward functions associated with each of the plurality of vehicles using IRL. In particular, the plurality of vehicles for which driving data is received may be manually driven vehicles, so that human driving tendencies can be observed. Accordingly, the vehicle data to be analyzed may be received by the vehicle data reception module 314. In some examples, vehicle data may be received directly from connected vehicles. In other examples, the vehicle data reception module 314 may receive vehicle data from one or more sources that collect vehicle data (e.g., from the project of Safety Pilot Model Deployment (SPMD)).

The vehicle data received by the vehicle data reception module 314 may comprise driving data from vehicles in a variety of situations. For example, vehicle data may include a velocity, trajectory, acceleration, and distance from other vehicles at a variety of time steps for a plurality of vehicles. In other examples, the vehicle data may include other data points associated with vehicles. When vehicle data is received from an external source (e.g., SPMD), the vehicle data may also include a vehicle ID that uniquely identifies the vehicle associated with the data. This may allow the P-ACC server 102 to aggregate vehicle data for each of a plurality of vehicles for which vehicle data is received. As discussed above, vehicle data received by the vehicle data reception module 314 may be stored in the database 312.

The data received from the plurality of vehicles may be used as training data to train the P-ACC server 102 as discussed in further detail below. The P-ACC server 102 may be trained in an off-line manner. That is, the training data may be past data that may be analyzed using more computationally intensive techniques that may be feasible for on-line operation. The vehicle data reception module 314 may also receive vehicle data from the ego vehicle 104 during on-line operation. That is, vehicle data from the ego vehicle 104 may be received and analyzed in a real-time manner, as discussed in further detail herein.

The vehicle data filter module 316 may filter vehicle data received by the vehicle data reception module 314 in order to extract driving data associated with car following events. The driving data received by the vehicle data reception module 314 may include data from a variety of driving situations including many driving situations when a vehicle is not following another vehicle. However, the P-ACC server 102 disclosed herein is only interested in driving situations in which a vehicle is following another vehicle. As such, the vehicle data filter module 316 may filter out driving data for which a vehicle is not following another vehicle and extract all vehicle following driving events.

In embodiments, the vehicle data filter module 316 may identify vehicle following driving events based on a variety of factors including a distance between a following vehicle and a preceding vehicle, and relative speeds between the vehicles, among other factors. For example, the vehicle data filter module 316 may identify car following events in which a following vehicle has followed its closest preceding vehicle for at least 30 seconds, during which time the distance between the vehicles was less than 120 meters and the speed of the following vehicle was between 18 m/s and 43 m/s. However, in other examples, it should be understood that the vehicle data filter module 316 may use other parameters and/or other thresholds to extract vehicle following events. Once the vehicle data filter module 316 has extracted vehicle following events from the received driving data, the extracted vehicle data may be analyzed as disclosed herein.

The IRL module 318 may utilize inverse reinforcement learning to determine reward functions for each of the plurality of vehicles for which driving data was received by the vehicle data reception module 314 and one or more vehicle following events were extracted, based on the vehicle following data extracted by the vehicle data filter module 316. A reward function in reinforcement learning determines the policy that an agent will adopt to act in an environment. However, a reward function may not always be readily available. As such, in inverse reinforcement learning methods, an agent's behavior is observed and a reward function is determined based on the observed behavior.

In vehicle following situations, different drivers may each have their own driving styles. For example, some drivers may follow other vehicles more closely, some drivers may have different preferred following speeds, and the like. As such, each driver may have a different reward function associated with different driving actions in different driving situations. Accordingly, IRL may be used to determine a reward function for a driver by observing the driver's driving behavior in different situations.

A reward function is typically formed as a linear combination of binary features $\Phi: S \times A \rightarrow \{0,1\}$ where S denotes the state space that the agent can perceive in the environment, and A denotes the action space comprising the various actions that the agent can perform. The reward function for ego vehicle E can be denoted as $R_E(s, a) = \sum_{m=1}^{M} \omega_m \cdot \Phi_m(s, a)$ where M is the number of features and ω is the weight. Ultimately, the IRL module 318 learns the weights such that the demonstrated behavior is optimal.

Model-based IRL methods such as Bayesian inference, maximum entropy, and maximum likelihood estimation require prior knowledge of a transition function, which is not easy to obtain in real life. Accordingly, in embodiments disclosed herein, the IRL module 318 utilizes model-free IRL methods. In the illustrated example, the IRL module 318 utilizes Q-averaging by estimating a Q-value without knowledge of the transition function. However, in other examples, other types of model-free IRL may be used.

In the illustrated example, data extracted by the vehicle data filter module 316 is aggregated into 1 data point for every 3 seconds of data. This allows for the capture of the variability of driving states. However, in other examples, vehicle data may be aggregated in any other way.

In embodiments, a state space is defined with two state variables, d and v. The variable d represents the relative distance from the ego vehicle to its closest preceding vehicle. The variable v represents the velocity of the ego vehicle. In the illustrated example, the vehicle speed v and the relative distance d are each discretized into 5 evenly spaced intervals. As such, this results in 25 potential states for each vehicle, which corresponds to 25 different features. However, in other examples, the vehicle data may be discretized in any other manner.

The actions that can be taken by the ego vehicle comprise accelerating or decelerating the vehicle. In the illustrated example, the actions that can be taken by the ego vehicle are discretized into five potential actions: high brake, mild brake, minimal acceleration, mild acceleration, and high acceleration. In the illustrated example, high brake means acceleration of less than $-1.46$ m/s$^2$, mild brake means acceleration between $-1.46$ and $-0.18$ m/s$^2$, minimal acceleration means acceleration between $-0.18$ and $0.18$ m/s$^2$, mild acceleration means acceleration between $0.18$ and $1.46$ m/s$^2$, and high acceleration means acceleration greater than $1.46$ m/s$^2$. However, in other examples, the actions of the ego vehicle may be discretized in any other manner.

Figure 4:
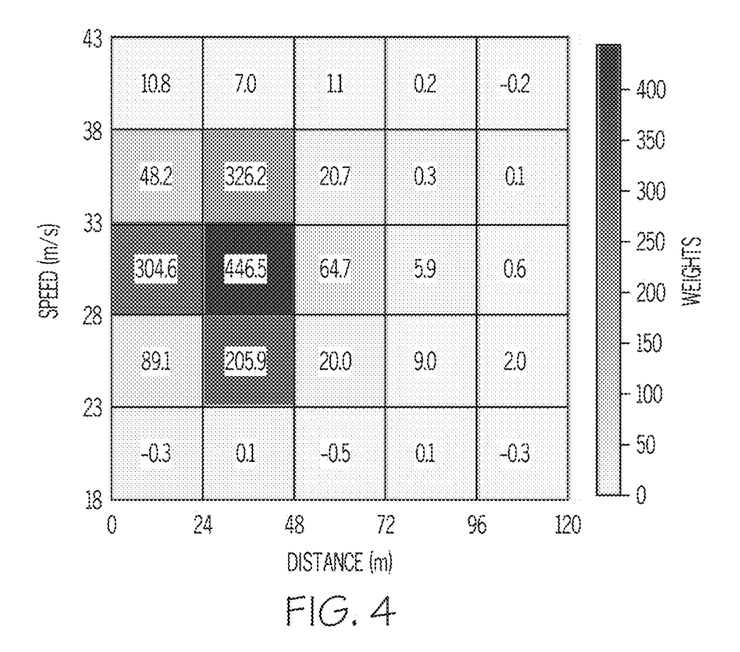
FIG. 4 visually depicts an example reward function, according to one or more embodiments shown and described herein.

Using the above parameters, the IRL module 318 may utilize inverse reinforcement learning to learn weights of the reward function for each driver for which driving data was received by the vehicle data reception module 314. FIG. 4 shows weights for an example reward function associated with an example driver that may be learned by the IRL module 318. In the example of FIG. 4, the feature with the highest weight is a speed between 28 m/s and 33 m/s and a following distance between 24 m and 48 m. As such, these are the vehicle following conditions that this example driver is most comfortable with. Furthermore, the cumulative weights of the states with a following distance between 24 m and 48 m is greater than the cumulative weights of the states with a speed between 28 m/s and 33 m/s. This indicates that this particular driver prefers maintaining a stable distance rather than maintaining a stable speed. The states with the lowest weights indicate the least preferred states of the example driver.

As discussed above, the IRL module 318 may use model-free inverse reinforcement learning to learn a reward function for each driver for which driving data comprising vehicle following events was received as a 25-dimensional vector. In the illustrated example, this vector is normalized to have values between $[-1, 1]$ for each driver. This normalized vector may be easier to work with by the other memory modules 304 of FIG. 3 without losing any information of each driver's preference. However, in other examples, the reward function may have a different number of dimensions and/or may not be normalized.

Referring back to FIG. 3, the driver clustering module 320 may perform clustering of the reward functions determined by the IRL reinforcement learning module as disclosed herein. As discussed above, during on-line operation, it may be computationally expensive to learn a reward function for a driver in real-time. Accordingly, rather than performing this computationally expensive process, the P-ACC server 102 may use clustering analysis to determine a plurality of groups associated with several archetypal driving preferences. A centroid reward function may be determined for each group. Then, during on-line operation, the driving actions of a driver may be analyzed to determine which group they are most likely to be a part of, as disclosed herein. The P-ACC server 102 may then use the centroid reward function for that group as the reward function for the driver, rather than learning a personalized reward function for the driver using IRL.

In embodiments, the driver clustering module 320 uses K-means clustering to divide the reward functions for each driver determined by the IRL module 318 into K clusters such that each reward function belongs to the cluster with the nearest mean. In the illustrated example, the driver clustering module 320 may utilize the elbow method to determine an optimal number of clusters.

Figure 5:
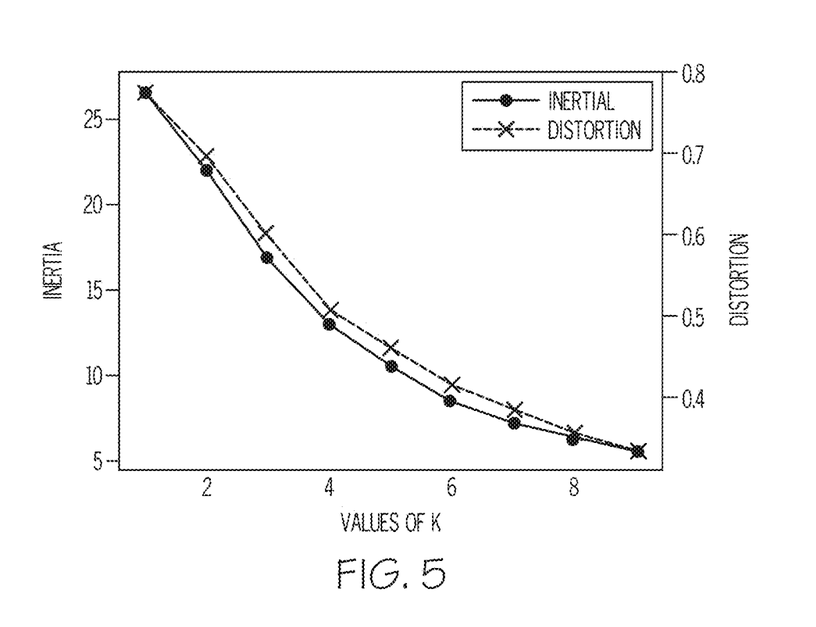
FIG. 5 depicts a plot of inertia and distortion for a sample data set of 85 drivers, according to one or more embodiments shown and described herein.

In embodiments, the driver clustering module 320 may determine inertia and distortion with respect to the value of K. Inertia is the sum of squared distances of samples to their closest cluster center. Distortion is the average of the squared distances from the cluster centers of the respective clusters using Euclidean distance metric. Both inertia and distortion will decrease with the increase of clustering number K as the sample partition becomes more refined. Typically, the decrease will be sharp before reaching the true clustering number, and will become more flat thereafter. FIG. 5 shows a plot of inertia and distortion for a sample data set of 85 drivers taken from SPMD. As can be seen in the example of FIG. 5, the decrease in both inertia and distortion begins to flatten out after the value of K reaches 4. Accordingly, in the illustrated example, the driver clustering module 320 clusters drivers into 4 different groups. However, in other examples, a different value of K may be used such that a different number of clusters is used.

Once the number of clusters is selected, the driver clustering module 320 uses K-means clustering to associate each driver with one particular cluster based on the reward function associated with each driver. After the cluster analysis is performed, a centroid reward function may be determined for each cluster, as discussed in further detail below.

Referring back to FIG. 3, the centroid reward function determination module 322 may determine a centroid reward function for each cluster determined by the driver clustering module 320. As discussed above, the driver clustering module 320 assigns each driver for which driving data was received into one of K clusters (e.g., 4 clusters in the illustrated example). The centroid reward function determination module 322 may then determine a centroid reward function for each cluster based on the reward functions associated with each driver in the cluster. In one example, the centroid reward function determination module 322 may take the average of the features of all of the reward functions in the cluster to determine the centroid reward function.

However, in other examples, the centroid reward function determination module 322 may combine the reward functions associated with a cluster in other ways to determine a centroid reward function.

Figure 6:
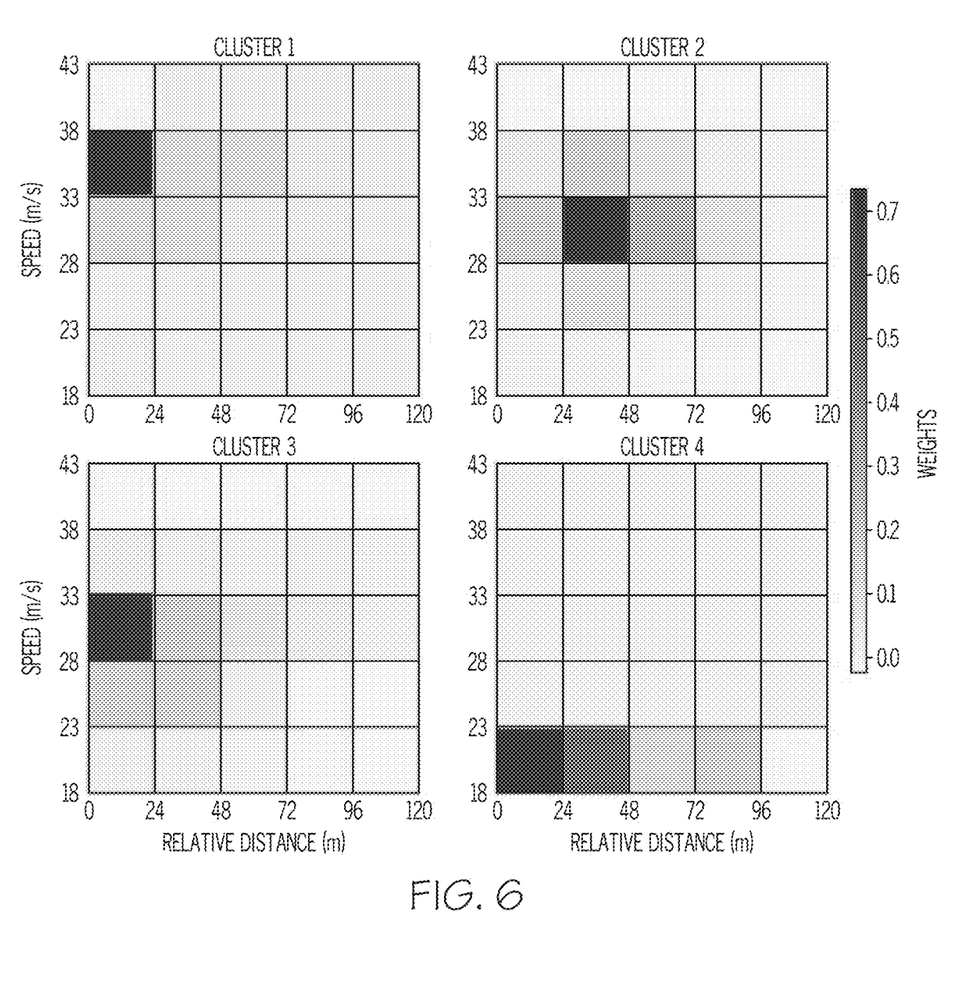
FIG. 6 depicts centroids of normalized weights for four example clusters based on sample data, according to one or more embodiments shown and described herein.

FIG. 6 shows centroids of normalized weights for four example clusters based on sample data. In the example of FIG. 6, drivers in cluster 1 prefer to drive at a relative high speed with a short following distance, drivers in clusters 2 and 3 prefer states with speeds between 28 m/s and 33 m/s, with drivers in cluster 2 preferring a larger following distance, and drivers in cluster 4 prefer to drive at a relatively low speed with a short following distance.

Figure 7:
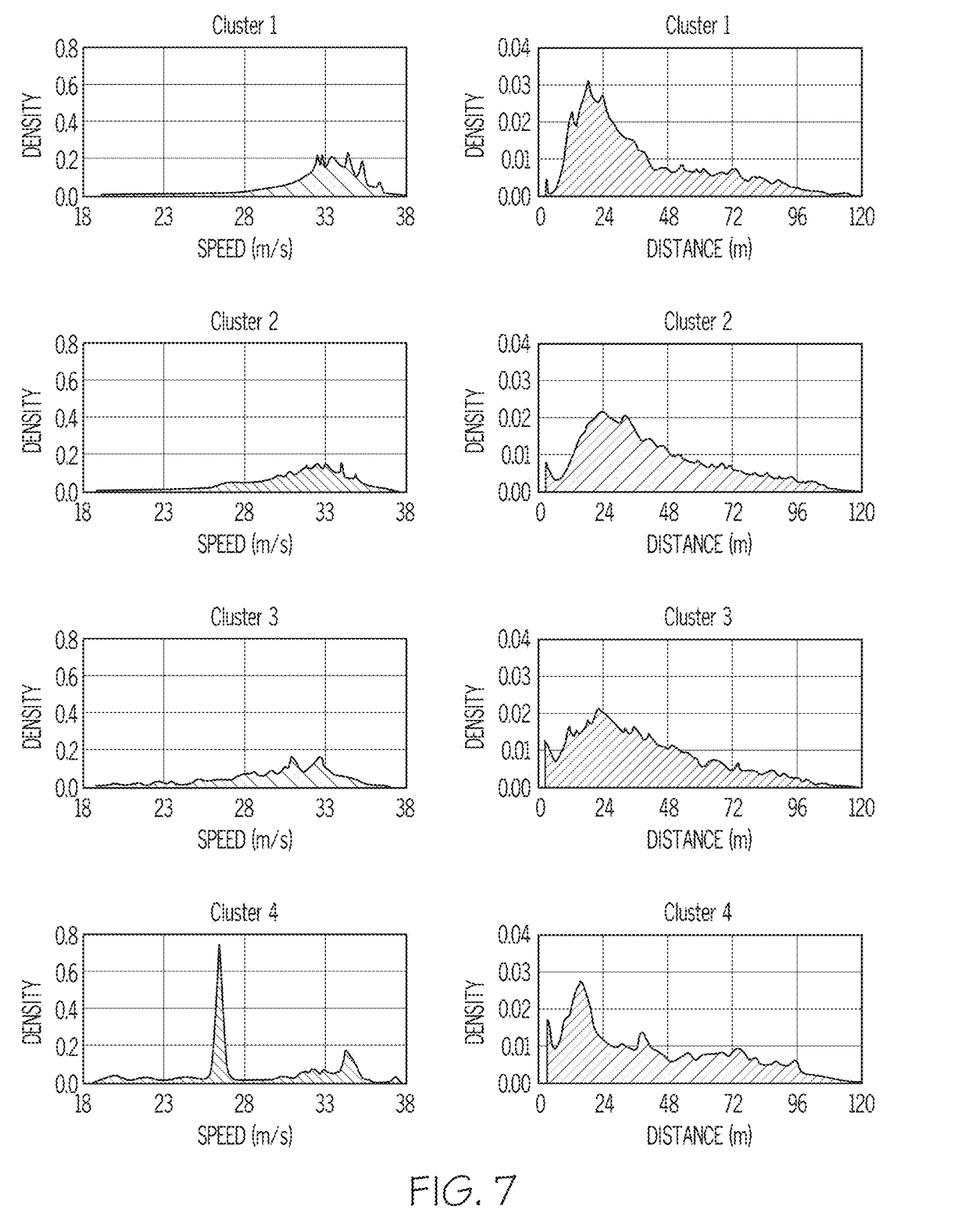
FIG. 7 depicts histograms of the speeds and following distances for the four centroid reward functions of FIG. 6, according to one or more embodiments shown and described herein.
Figure 8:
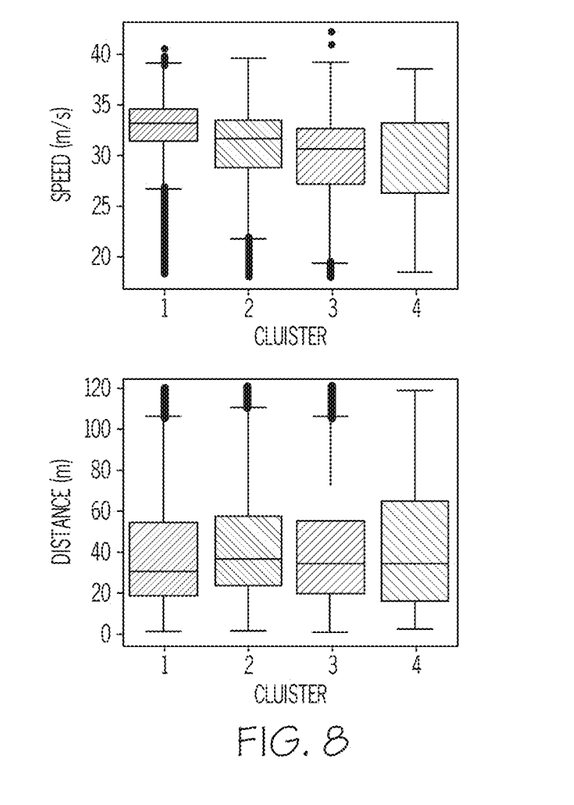
FIG. 8 depicts boxplots of the speeds and following distances of the centroid reward functions of FIGS. 6 and 7, according to one or more embodiments shown and described herein.

FIG. 7 shows histograms of the speeds and following distances for the four clusters of drivers from the example of FIG. 6. As can be seen in FIG. 7, the distribution of speeds and following distances for each cluster have different shapes, indicating different driving styles. FIG. 8 shows boxplots of the speeds and following distances of each cluster from the examples of FIGS. 6 and 7. As can be seen in FIG. 8, cluster 1 has the greatest median speed, while cluster 4 has the lowest median speed. Cluster 4 also has the widest range of values. These characteristics are consistent with the styles represented by the reward functions for each cluster.

Referring back to FIG. 3, the Gaussian Mixture Model (GMM) module 324 may determine outputs of a GMM, as disclosed herein. GMM has proven effective in modelling various driving behaviors. In particular, driving data can be modelled as a linear combination of Gaussian distributions, as shown in the equation below.

$p(z)=\Sigma_{i=1}^{M}\pi_i p(x|\mu_i, \sigma_i)$, where M is the number of Gaussian distributions, the $i^{th}$ component is a multivariate Gaussian distribution $G(\mu_i, \sigma_i)$ with weight $\pi_i$.

In embodiments, each driver for which data is received by the vehicle data reception module 314 may be modelled using a GMM f(x) individually. In addition, each cluster of drivers, as determined by the driver clustering module 320 may be modelled into a GMM g(x). In the illustrated example, up to ten driving events for each driver may be used to determine a GMM output. However, in other examples, any other number of driving events may be used to determine a GMM output.

When driving data associated with a new driver is received, the P-ACC server 102 may determine which cluster the driver belongs to using GMM, which is less computationally expensive than using IRL. In embodiments, the GMM module 324 may determine which cluster the new driver is most similar to based on KL-divergence, using the equation below.

$$D(f\|g) = \int f(x)\log\frac{f(x)}{g(x)}dx$$

Figure 9:
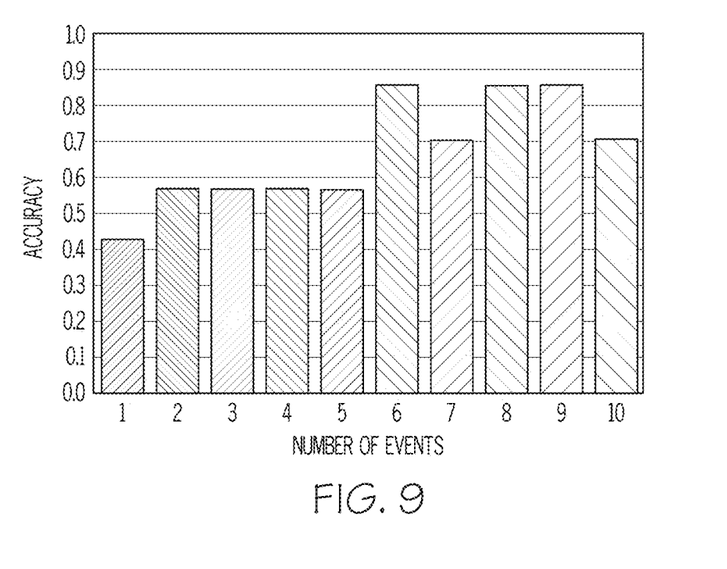
FIG. 9 depicts prediction accuracy for sample data, according to one or more embodiments shown and described herein.

Because the above integral is not tractable, the GMM module 324 may use Monte-Carlo sampling to approximate the KL-divergence. After the GMM module 324 determines the KL-divergence between the driving data associated with the new driver and the different clusters, the cluster selection module 326 may assign the new driver to the cluster with the smallest KL-divergence. FIG. 9 shows prediction accuracy for the sample data received from SPMD based on the number of events used for the GMM model. As shown in FIG. 9, if the number of events used is less than 6, the accuracy is less than 60%. However, the accuracy increases when the number of events is increased beyond 6. In the example of FIG. 9, the best accuracy is 85.7% for either 6, 8 or 9 events. As such, this data indicates that the embodiments disclosed herein are able to predict a personalized reward function for drivers with limited data.

Referring back to FIG. 3, the driving action determination module 328 may determine driving actions based on the reward function as disclosed herein. As discussed above, a training data set may be received by the vehicle data reception module 314. The IRL module 318 may learn reward functions for each driver that is part of the data set using inverse reinforcement learning, and the driver clustering module 320 may cluster the learned driver reward functions into a plurality of groups. The centroid reward function determination module 322 may determine a centroid reward function for each group determined by the driver clustering module 320.

After the centroid reward functions for the various clusters are determined by the centroid reward function determination module 322, an on-line system may receive real-time driving data associated with a new driver (e.g., the driver of the ego vehicle 104) and the cluster selection module 326 may assign a reward function associated with one of the clusters to the new driver. In particular, the GMM module 324 may determine a GMM output based on the driving data of the new driver, and the cluster selection module 326 may assign the new driver to one of the clusters as discussed above. In particular, the cluster selection module 326 may consider the centroid reward function of the selected cluster as the personalized reward function for the new driver. Once the personalized reward function has been determined for the new driver, driving decisions for the new driver may be determined by the driving action determination module 328 as disclosed herein in order to perform P-ACC.

In embodiments, the driving action determination module 328 implements P-ACC based on cost-constrained partially observable Monte-Carlo Planner (CC-POMCP) using the reward function as disclosed herein. POMDP may be denoted as a tuple (S, A, τ, R, O, δ, γ), where S is a set of states, A is a set of actions, τ is the transition function representing conditional transition probabilities between states, R: S×A→$\mathbb{R}$ is the real-valued reward function, O is a set of observations, δ is the observation function representing the conditional probabilities of observations given states and actions, and γ∈[0,1] is the discount factor. At each time step t, given an action $a_t \in A$, a state $s_t \in S$ evolves to $s_{t+1} \in S$ with probability $\tau(s_{t+1}|s_t, a_t)$.

The agent receives a reward R $(s_t, a_t)$, and makes an observation $o_{t+1} \in O$ about the next state $s_{t+1}$ with probability $\delta(o_{t+1}|s_{t+1}, a_t)$. The goal of POMDP planning is to compute the optimal policy that chooses actions to maximize the expectation of the cumulative reward $V_R = \mathbb{E}[\Sigma_{t=0}^{\infty}\gamma^t R(s_t, a_t)]$. Constrained POMDP is a generalization of POMDP for multiple objectives. Its goal is to computer the optimal policy that maximizes $V_R$ while constraining the expected cumulative costs $V_C = \mathbb{E}[\Sigma_{t=0}^{\infty}\gamma^t C(s_t, a_t)]$, where $C(s_t, a_t)$ is below a threshold c.

Figure 10:
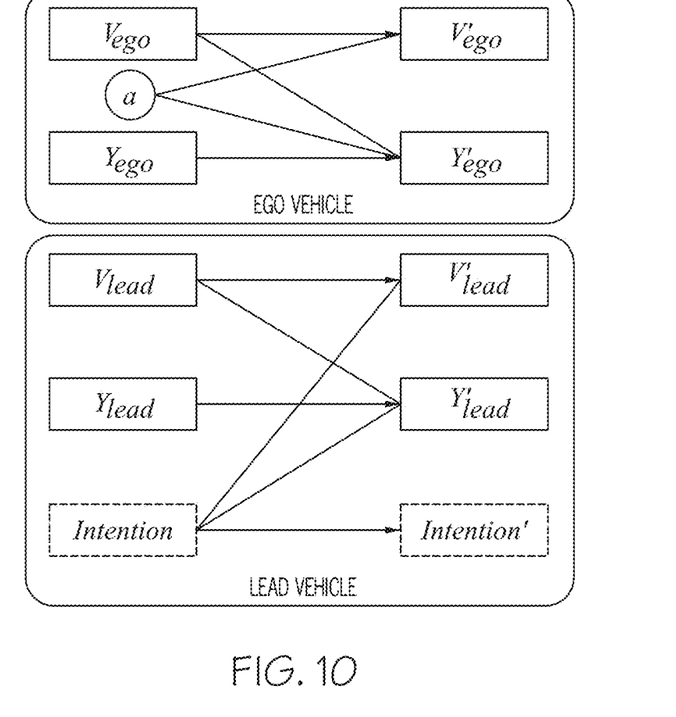
FIG. 10 illustrates an example POMDP model to simulate a driving situation of one ego vehicle following a leading vehicle on a straight highway, according to one or more embodiments shown and described herein.

FIG. 10 illustrates an example POMDP model to simulate a driving situation of one ego vehicle following a leading vehicle on a straight highway. In the example of FIG. 10, $v_{ego}$ and $y_{ego}$ represent the speed and position of the ego vehicle, respectively, and $v_{lead}$ and $y_{egleado}$ represent the speed and position of the leading vehicle, respectively. In addition, the intention of the leading vehicle's driver is modelled as a hidden state. In the illustrated example, this intention can take one of three values: hesitating, normal, and aggressive. The action α in the example POMDP model is the acceleration of the ego vehicle. In the illustrated example, the acceleration can take one of three values: −0.6 m/s$^2$, 0, and 0.6 m/s$^2$.

Figure 11:
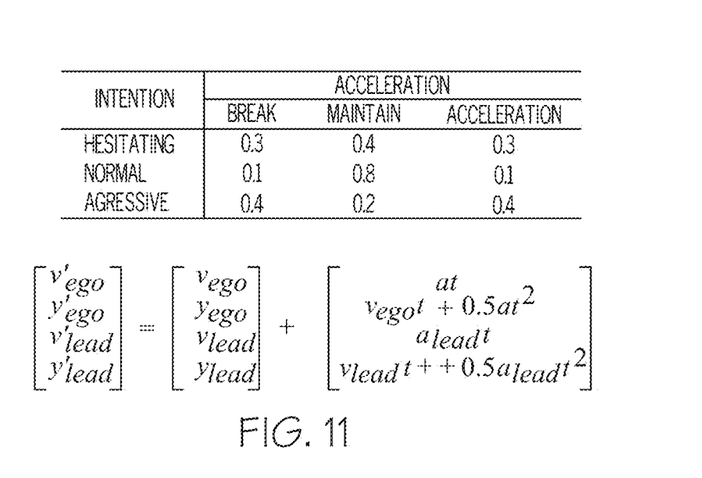
FIG. 11 depicts example state transitions for the POMDP model of FIG. 10, according to one or more embodiments shown and described herein.

The state transitions of the illustrated example may be represented as shown in FIG. 11. We assume that the behavior of the leading vehicle is dictated by its driver's intention, as described in the table of FIG. 11. That is, if the intention of the leading vehicle driver is hesitating, we assume that the probability of braking is 0.3, the probability of maintaining is 0.4, and the probability of accelerating is 0.3.

In the illustrated example, the driving action determination module 328 employs a CC-POMCP solver to determine a driving action for the ego vehicle 104. A state is sampled from the root node's belief and is further used to sample a trajectory. More simulations tend to yield a higher cumulative reward and a lower cumulative cost. However, more simulations require a longer computational time. In the illustrated example, it is desired to output vehicle control commands at 1 Hz, and as such, computational time is limited to less than 1 second. However, in other examples, different frequencies of vehicle control commands may be used with different computational times.

Using the above described techniques, the driving action determination module 328 may determine driving actions (e.g., acceleration amounts) based on detected driving situations in order to mimic the ego vehicle driver's tendencies. As such P-ACC may be implemented such that the driver of the ego vehicle is more comfortable during autonomous driving.

Referring back to FIG. 3, the driving action transmission module 330 may transmit the driving actions determined by the driving action determination module 328 to the ego vehicle 104 to cause the ego vehicle 104 to perform the determined driving actions. Upon receiving the driving actions, the ego vehicle 104 may autonomously perform the driving actions while following another vehicle (e.g., the vehicle 106 of FIG. 1), in order to implement P-ACC and mimic the driver's preferred vehicle following behavior.

In some examples, the driving action determination module 328 may be part of the vehicle system 200 of the ego vehicle 104. In these examples, the p-ACC server 102 may transmit the reward function associated with the driver of the ego vehicle 104 to the vehicle system 200. The vehicle system 200 may then utilize the received reward function to determine autonomous driving actions for the ego vehicle 104 using the techniques described above with respect to the driving action determination module 328.

Figure 12:
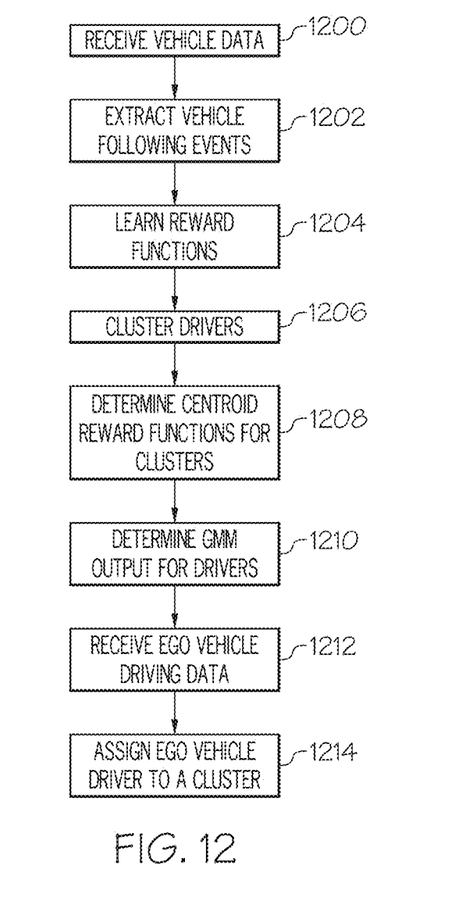
FIG. 12 depicts a flowchart of a method of operating the P-ACC server of FIGS. 1 and 3, according to one or more embodiments shown and described herein.

FIG. 12 depicts a flowchart of an example method for operating the P-ACC server 102 of FIGS. 1 and 3 to determine a personalized reward function. At step 1200, the vehicle data reception module 314 receives vehicle data associated with a plurality of vehicles. This vehicle data may be used for training the p-ACC server 102 as described herein. The vehicle data may include a variety of driving data about a plurality of vehicles including speeds, accelerations, positions, and relative positions of other vehicles at a plurality of time steps. The vehicle data may also include a vehicle ID indicating a particular vehicle associated with each piece of driving data.

At step 1202, the vehicle data filter module 316 extracts vehicle following events from the driving data received by the vehicle data reception module 314. In particular, the vehicle data filter module 316 may filter out driving events that do not constitute instances where one vehicle is following another vehicle. As such, the vehicle data filter module 316 may identify vehicle following driving events in the received driving data, which may be used to train the P-ACC server 102 as disclosed herein.

At step 1204, the IRL module 318 uses inverse reinforcement learning to learn reward functions based on the vehicle following events extracted by the vehicle data filter module 316. In particular, the IRL module 318 may learn a reward function for each driver for which one or more vehicle following events were extracted by the vehicle data filter module 316. In embodiments, a learned reward function may comprise weights for a plurality of states based on a speed of a vehicle and a distance between the vehicle and a leading vehicle. The weights for each state may indicate a driver's preference for that state. In some examples, a state may be based on other types of vehicle data in addition to a speed of a vehicle and a following distance.

At step 1206, the driver clustering module 320 performs clustering analysis to associate each driver for which a reward function was determined by the IRL module 318 into one of a plurality of clusters. In the illustrated example, the driver clustering module 320 performs K-means clustering. However, in other examples, other types of clustering analysis may be performed. In the illustrated example, the driver clustering module 320 divides the drivers into four clusters. However, in other examples, any other number of clusters may be used. In embodiments, the driver clustering module 320 assigns drivers to a cluster with other drivers having a similar reward function. Accordingly, each cluster may represent a different general style of driving in vehicle following situations.

At step 1208, the centroid reward function determination module 322 determines a centroid reward function for each of the clusters determined by the driver clustering module 320. In one example, the centroid reward function determination module 322 may average the weights of all the reward functions in a particular cluster to determine the reward function for that cluster. However, in other examples, the centroid reward function determination module 322 may combine the clusters in any other manner.

At step 1210, the GMM module 324 determines an output of a Gaussian Mixture Model for each driver for which vehicle following events were extracted by the vehicle data filter module 316. In particular, the GMM module 324 inputs vehicle following driving data associated with each driver into a GMM comprising a linear combination of Gaussian distributions. The outputs of the GMM for each driver may be stored in the database 312.

At step 1212, the vehicle data reception module 314 receives real-time driving data from the ego vehicle 104. In particular, after the P-ACC server 102 has been trained to learn centroid reward functions for a plurality of clusters in an off-line manner as discussed above, the P-ACC server 102 may be operated in an on-line manner to learn a personalized reward function for a driver of the ego vehicle 104. Accordingly, when a driver of the ego vehicle 104 is manually driving the ego vehicle 104, vehicle data may be transferred from the ego vehicle 104 to the P-ACC server 102. This driving data may be received by the vehicle data reception module 314.

At step 1214, the driving data for the ego vehicle driver may be input into the GMM module 324 in order to determine an output of the GMM based on the ego vehicle driving data. The cluster selection module 326 may then compare this GMM output to the GMM outputs stored in the database 312 for the drivers of the training data. The cluster selection module 326 may determine which driver has the most similar GMM output to the GMM output of the ego vehicle 104 based on KL-divergence (e.g., having the lowest KL-divergence). The cluster selection module 326 may then assign the ego vehicle driver to the same cluster that the driver having the most similar GMM output is assigned to. The centroid reward function for that cluster may then be used as a personalized reward function for the ego vehicle 104. In some examples, the determined reward function may be transmitted to the ego vehicle 104.

Figure 13:
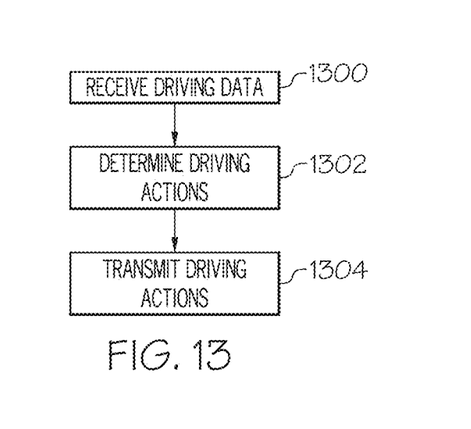
FIG. 13 depicts a flowchart of another method of operating the P-ACC server of FIGS. 1 and 3, according to one or more embodiments shown and described herein.

FIG. 13 depicts a flowchart of an example method for operating the P-ACC server 102 of FIGS. 1 and 3 to cause the ego vehicle 104 to perform autonomous driving. At step 1300, the vehicle data reception module 314 receives driving data from the ego vehicle 104 during autonomous driving while following another vehicle (e.g., the vehicle 106 of FIG. 1). The driving data may comprise a speed of the ego vehicle 104 and a distance between the ego vehicle 104 and the vehicle 106. The driving data may also comprise a speed of the vehicle 106.

At step 1302, the driving action determination module 328 determines a driving action for the ego vehicle 104. In particular, the driving action determination module 328 may determine the driving action based on the driving data received by the vehicle data reception module 314 and the personalized reward function for the ego vehicle 104, as determined using the method described with respect to FIG. 12. The driving action determination module 328 may determine the driving action using a CC-POMCP solver as described above.

At step 1304, the driving action transmission module 330 transmits the driving actions determined by the driving action determination module 328 to cause the ego vehicle 104 to perform the driving actions. In some examples, the steps of FIG. 13 may be performed by the vehicle system 200 of the ego vehicle 104 rather than the P-ACC server 102.

It should now be understood that embodiments described herein are directed to a method and system for modeling personalized car-following driving styles with model-free inverse reinforcement learning. Driving data for a naturalistic driving data of a plurality of drivers set may be received and vehicle following events may be extracted from the data set. Model-free IRL may be used to learn a reward function for each driver having vehicle following events in the driving data set. The drivers may be clustered into a plurality of representative groups, with the drivers in each group having a similar reward function. A centroid reward function may then be determined for each group. A GMM output is also determined for each driver for which a reward function is determined.

Driving data may then be received during on-line operation for an ego vehicle being manually driven. A GMM output may be determined for the received driving data associated with ego vehicle. The GMM output for the ego vehicle driving data may be compared to the GMM output for each of the previously received driving data and the closest GMM output may be determined using KL-divergence. The ego vehicle may then be assigned to the cluster into which the vehicle having the closest GMM output is assigned. The centroid reward function for that cluster may be used as a personalized reward function for the ego vehicle.

During autonomous driving, vehicle data for the ego vehicle may be received. The determined personalized reward function for the ego vehicle may be used to determine a driving action for the ego vehicle based on the received driving data. The ego vehicle may then be autonomously controlled to perform the determined driving action to mimic the naturalistic tendencies of the driver.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    learning reward functions for a plurality of first vehicles based on first vehicle data associated with the plurality of first vehicles using inverse reinforcement learning;
    performing cluster analysis to associate each vehicle of the plurality of first vehicles with one cluster of reward functions among a plurality of clusters of reward functions based on the learned reward functions;
    determining a centroid reward function for each of the clusters of reward functions based on the reward functions associated with each cluster of reward functions;
    performing a comparison between second vehicle data associated with a second vehicle and the first vehicle data;
    determining a vehicle among the plurality of first vehicles that is most similar to the second vehicle data based on the comparison;
    associating the second vehicle with the cluster of reward functions associated with the determined vehicle; and
    controlling operation of the second vehicle based on the centroid reward function of the cluster of reward functions associated with the second vehicle.

2. The method of claim 1, further comprising extracting a vehicle event as a vehicle following event and obtaining the first vehicle data associated with a first vehicle when the first vehicle has a speed within a threshold range and a distance between the first vehicle and a leading vehicle driving ahead of the first vehicle is less than a threshold distance.

3. The method of claim 1, wherein each of the reward functions comprises a weight for each of a plurality of states associated with corresponding first vehicle.

4. The method of claim 3, wherein each state of the plurality of states comprises corresponding first vehicle having a speed within a particular speed range and a following distance behind a leading vehicle within a particular distance range.

5. The method of claim 1, further comprising associating each vehicle of the plurality of first vehicles with one cluster among the plurality of clusters using K-means clustering.

6. The method of claim 1, further comprising determining the centroid reward function for each of the clusters by averaging weights of each of the reward functions associated with each cluster.

7. The method of claim 1, further comprising performing the comparison between the second vehicle data associated with the second vehicle and the first vehicle data by:
    determining an output of a Gaussian mixture model for each vehicle of the plurality of first vehicles based on the first vehicle data;

determining a second output of the Gaussian mixture model for the second vehicle based on the second vehicle data; and comparing the second output of the Gaussian mixture model for the second vehicle to the output of the Gaussian mixture model for each vehicle of the plurality of first vehicles.

8. The method of claim 7, further comprising:

comparing the second output of the Gaussian mixture model for the second vehicle to the output of the Gaussian mixture model for each vehicle of the plurality of first vehicles based on a Kullback-Leibler (KL)-divergence.

9. The method of claim 8, further comprising using Monte-Carlo sampling to approximate the KL-divergence.

10. The method of claim 1, further comprising:

determining inertia and distortion based on the number of clusters; and determining the number of clusters based on a plot of the inertia and the distortion.

11. The method of claim 1, further comprising:

receiving third vehicle data associated with the second vehicle driving autonomously;

determining a driving action to perform based on the third vehicle data and the centroid reward function of the cluster associated with the second vehicle; and causing the second vehicle to perform the driving action.

12. The method of claim 11, wherein the third vehicle data comprises a speed of the second vehicle, a speed of a leading vehicle driving in front of the second vehicle, and a distance between the second vehicle and the leading vehicle.

13. The method of claim 11, wherein the driving action comprises an amount to accelerate or decelerate the second vehicle.

14. The method of claim 11, further comprising using a cost-constrained partially observable Monte-Carlo planner to determine the driving action.

15. A computing device comprising a controller programmed to:

learn reward functions for a plurality of first vehicles based on first vehicle data associated with the plurality of first vehicles using inverse reinforcement learning;

perform cluster analysis to associate each vehicle of the plurality of first vehicles with one cluster of reward functions among a plurality of clusters of reward functions based on the learned reward functions;

determine a centroid reward function for each of the clusters of reward functions based on the reward functions associated with each cluster of reward functions;

perform a comparison between second vehicle data associated with a second vehicle and the first vehicle data;

determine a vehicle among the plurality of first vehicles that is most similar to the second vehicle data based on the comparison;

associate the second vehicle with the cluster of reward functions associated with the determined vehicle; and control operation of the second vehicle based on the centroid reward function of the cluster of reward functions associated with the second vehicle.

16. The computing device of claim 15, wherein the controller is further programmed to determine the centroid reward function for each of the clusters by averaging weights of each of the reward functions associated with each cluster.

17. The computing device of claim 15, wherein the controller is further programmed to perform the comparison between the second vehicle data associated with the second vehicle and the first vehicle data by:

determining an output of a Gaussian mixture model for each vehicle of the plurality of first vehicles based on the first vehicle data;

determining a second output of the Gaussian mixture model for the second vehicle based on the second vehicle data; and comparing the second output of the Gaussian mixture model for the second vehicle to the output of the Gaussian mixture model for each vehicle of the plurality of first vehicles.

18. The computing device of claim 17, wherein the controller is further programmed to:

compare the second output of the Gaussian mixture model for the second vehicle to the output of the Gaussian mixture model for each vehicle of the plurality of first vehicles based on a KL-divergence.

19. The computing device of claim 15, wherein the controller is further programmed to:

receive third vehicle data associated with the second vehicle driving autonomously;

determine a driving action to perform based on the third vehicle data and the centroid reward function of the cluster associated with the second vehicle; and cause the second vehicle to perform the driving action.

20. The computing device of claim 19, wherein the computing device is further programmed to use a cost-constrained partially observable Monte-Carlo planner to determine the driving action.

* * * * *